(12) United States Patent
Labude et al.

(10) Patent No.: US 6,399,676 B1
(45) Date of Patent: Jun. 4, 2002

(54) DRAG-REDUCING POLYMER SUSPENSIONS

(75) Inventors: Katrina M. Labude; Kenneth W. Smith, both of Tonkawa; Timothy L. Burden, Ponca City, all of OK (US)

(73) Assignee: Conoco, Inc., Houston, TX (US)

(*) Notice: Subject to any disclaimer, the term of this patent is extended or adjusted under 35 U.S.C. 154(b) by 0 days.

(21) Appl. No.: 09/723,399

(22) Filed: Nov. 28, 2000

(51) Int. Cl.$^7$ .................................................. C08L 3/00

(52) U.S. Cl. .......................................... 523/309; 137/13

(58) Field of Search ............................. 523/309; 137/13

(56) References Cited

U.S. PATENT DOCUMENTS

| | | | |
|---|---|---|---|
| 2,879,173 A | 3/1959 | Tacoe | 117/16 |
| 2,895,939 A | 7/1959 | Stober et al. | 260/45.5 |
| 3,190,565 A | 6/1965 | Jayne | 241/22 |
| 3,215,154 A | 11/1965 | White et al. | 137/13 |
| 3,351,601 A | 11/1967 | Blaga et al. | 260/28.5 |
| 3,528,841 A | 9/1970 | Donaldson et al. | 117/16 |
| 3,632,369 A | 1/1972 | Granville | 117/16 |
| 3,687,699 A | 8/1972 | Prosser et al. | 117/4 |
| 3,692,676 A | 9/1972 | Culter et al. | 252/8.55 |
| 3,730,275 A | 5/1973 | McClaflin et al. | 166/308 |
| 3,736,288 A | 5/1973 | Stratta et al. | 260/33.4 R |
| 3,739,991 A | 6/1973 | Wehren et al. | 241/45 |
| 3,771,729 A | 11/1973 | Grable | 241/65 |
| 3,791,913 A | 2/1974 | Ver Strate et al. | 161/164 |
| RE28,361 E | 3/1975 | Granville | 117/16 |
| 3,884,252 A | 5/1975 | Kruka et al. | 137/13 |
| 3,928,263 A | 12/1975 | Grant | 260/17 |
| 4,025,990 A | 5/1977 | Lovette | 241/14 |
| 4,066,539 A | 1/1978 | Hachisu et al. | 210/36 |
| 4,147,677 A | 4/1979 | Lundberg et al. | 260/23.5 A |
| 4,151,135 A | 4/1979 | McClain | 260/23 R |
| 4,157,790 A | 6/1979 | Benn et al. | 241/22 |
| 4,166,043 A | 8/1979 | Uhlmann et al. | 252/300 |
| 4,171,056 A | 10/1979 | Hannon et al. | 215/12 |
| 4,233,365 A | 11/1980 | Karg | 428/404 |
| 4,239,052 A | 12/1980 | McClaflin | 137/13 |
| 4,260,066 A | 4/1981 | Hannon et al. | 215/12 |
| 4,287,902 A | 9/1981 | McClaflin et al. | 137/13 |
| 4,289,679 A | 9/1981 | Mack | 260/33.6 PQ |
| 4,325,861 A | 4/1982 | Braun et al. | 523/205 |
| 4,333,488 A | 6/1982 | Gifford | 137/13 |
| 4,340,076 A | 7/1982 | Weitzen | 137/13 |
| 4,341,078 A | 7/1982 | Weitzen | 62/48 |
| 4,345,013 A | 8/1982 | Diamond et al. | 430/106.6 |
| 4,355,651 A | 10/1982 | McClaflin | 137/13 |
| 4,358,572 A | 11/1982 | Mack et al. | 526/142 |
| 4,371,455 A | 2/1983 | Mack et al. | 252/429 C |
| 4,382,108 A | 5/1983 | Carroll et al. | 428/326 |
| 4,415,714 A | 11/1983 | Mack | 526/125 |
| 4,420,400 A | 12/1983 | Weitzen | 210/710 |
| 4,428,535 A | 1/1984 | Venetucci | 241/35 |
| 4,433,123 A | 2/1984 | Mack | 526/139 |
| 4,440,916 A | 4/1984 | Waters et al. | 525/54.2 |
| 4,493,903 A | 1/1985 | Mack | 502/121 |
| 4,493,904 A | 1/1985 | Mack | 502/122 |
| 4,578,313 A | 3/1986 | Ito et al. | 428/403 |
| 4,584,244 A | 4/1986 | Fenton | 428/407 |
| 4,650,126 A | 3/1987 | Feder et al. | 241/22 |
| 4,693,321 A | 9/1987 | Royer | 137/13 |
| 4,720,397 A | 1/1988 | O'Mara et al. | 427/180 |
| 4,756,326 A | 7/1988 | Johnston | 137/13 |
| 4,771,799 A | 9/1988 | Baxter et al. | 137/13 |
| 4,771,800 A | 9/1988 | Pomeroy | 137/13 |
| 4,789,383 A | 12/1988 | O'Mara et al. | 44/55 |
| 4,826,728 A | 5/1989 | O'Mara et al. | 428/407 |
| 4,837,249 A | 6/1989 | O'Mara et al. | 523/175 |
| 4,881,566 A | 11/1989 | Ubels et al. | 137/13 |
| 4,945,142 A | 7/1990 | Gessell et al. | 526/128 |
| 4,952,738 A | 8/1990 | Gessell et al. | 585/3 |
| 5,027,843 A | 7/1991 | Grabois et al. | 137/13 |
| 5,165,441 A | 11/1992 | Mitchell | 137/13 |
| 5,244,937 A | 9/1993 | Lee et al. | 523/204 |
| 5,276,116 A | 1/1994 | Gessell et al. | 526/128 |
| 5,376,697 A | 12/1994 | Johnston et al. | 523/175 |
| 5,449,732 A | 9/1995 | Smith et al. | 526/348.3 |
| 5,504,131 A | 4/1996 | Smith et al. | 524/401 |
| 5,504,132 A | 4/1996 | Smith et al. | 524/401 |
| 5,539,044 A | 7/1996 | Dindi et al. | 524/570 |
| 5,942,461 A | 8/1999 | Brown et al. | 502/154 |
| 6,172,151 B1 | 1/2001 | Johnston et al. | 524/379 |

FOREIGN PATENT DOCUMENTS

| | | | |
|---|---|---|---|
| CA | 675522 | 12/1963 | 241/135 |
| EP | 0017368 | 3/1980 | 19/18 |
| GB | 1452146 | 12/1973 | C08J/3/08 |

OTHER PUBLICATIONS

Simmonds, D.K., Air Products Limited (publication and date unknown).

Frable, Norman B., "Keep Scrap Quality High with Cryogenic Grinding," Plastics Engineering, May 1976.

"Cryogenic Grinding System," Plastics & Rubber Weekly, Oct. 22, 1976.

"Cryogenic Grinding Gets a Lift from New Stress on Cost Reduction," Modern Plastics, Dec. 1977.

Disclosed Anonymously, Research Disclosure, Feb. 1984 "Agglomeration–free storage of polymeric dragreducers," Feb. 1984.

"Cryogenic Recycling Technology gets more Practical–Even for the Toughest Combinations of Materials," Modern Plastics, Jul. 1981.

Frable, Norman B., "Cryogenic Size Reduction of Plastics," Modern Plastics, May 1979.

(List continued on next page.)

Primary Examiner—Edward J. Cain
(74) Attorney, Agent, or Firm—Baker Botts, L.L.P.

(57) ABSTRACT

A hydrocarbon-soluble drag-reducing suspension is described, along with a process for manufacturing the drag-reducing suspension. The drag-reducing suspension is easily transportable, non-hazardous, easily handled, and provides a significant increase in drag-reducing capability over existing products. The drag-reducing suspension is manufactured by grinding an ultra-high molecular weight polymer in the presence of a grinding aid and mixing it with a suspending fluid.

17 Claims, 1 Drawing Sheet

OTHER PUBLICATIONS

Murtland, W.O., "Cryogrinding Scrap into Filler," Elastomerics, Mar. 1978.

Lester, C.B., "Drag–Reducing Agents–Conclusion," Oil & Gas Journal, Mar. 11, 1985.

Weishaupt, Dr.–Ing. J. et al.; "Size–Reduction of Thermoplastic Materials at Low Temperature and the Economic Aspects," Linde Reports on Science and Technology,, 15/1970.

Bajaj, J.K.L., "Grinding the Tough Plastics at Cryogenic Temperatures," Plastics Design & Processing, Feb. 1977.

Biddulph, Michael W., "Coolers for cryogenic grinding," Chemical Engineering, Feb. 11, 1980.

$N_2$itro Grind Cryogenic Grinding Systems brochure, 1977 Liquid Carbonic Corporation Form No. 6625.

Ricci, Larry J., "Cryogenic grinding: no quick thaw in CPI use," Chemical Engineering Jul. 4, 1973.

Oberpriller, Ing. Jakob; "Disintegration under Refrigeration of Substances with Poor Grinding Properties," Linde Reports on Science and Technology, 24/1976.

Frable, Norman B., Savage, Raymond W.; "Recycled scrap becomes valuable resource," Rubber World.

"Cryogenic Size–Reduction Technology Provides Economical Recycling Method," Elastomerics, Dec. 1977.

DRAG-REDUCING POLYMER SUSPENSIONS

FIELD OF THE INVENTION

The present invention relates to drag-reducing polymer suspensions and their method of manufacture. More specifically, this invention relates to a method for preparing an ultra-high molecular weight, substantially non-crystalline hydrocarbon soluble polymer suspension.

BACKGROUND OF THE INVENTION

A drag-reducing agent is one that substantially reduces the friction loss that results from the turbulent flow of a fluid. Where fluids are transported over long distances, such as in oil and other hydrocarbon liquid pipelines, these friction losses result in inefficiencies that increase equipment and operations costs. Ultra-high molecular weight polymers are known to function well as drag-reducing agents, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

Drag-reducing polymers are known in the art. Representative, but non-exhaustive, samples of such art are: U.S. Pat. No. 3,692,675, which teaches a method for reducing friction loss or drag for pumpable fluids through pipelines by adding a minor amount of a high molecular weight, non-crystalline polymer; and U.S. Pat. No. 3,884,252, which teaches the use of polymer crumb as a drag-reducing material. These materials are extremely viscoelastic and, in general, have no known use other than as drag-reducing materials. However, the very properties that make these materials effective as drag-reducing additives make them difficult to handle because they have a severe tendency to cold flow and reagglomerate even at subambient temperatures. Under conditions of pressure, such as stacking or palleting, cold flow is even more intense and reagglomeration occurs very quickly.

The general propensity of non-crosslinked elastomeric polymers (elastomers) to cold flow and agglomerate is well-known. Polymers of this sort cannot be pelletized or put into discrete form and then stored for any reasonable period of time without the materials flowing together to form large agglomerates. Because of such difficulties, elastomers are normally shipped and used as bales. However, such bales must be handled on expensive equipment and cannot be pre-blended. In addition, polymers such as the drag-reducing additives described are not susceptible to such balings, since cold flow is extremely severe. Further, dissolution time for such drag-reducing materials from a polymer state in the flowing hydrocarbons to a dissolved state is so lengthy as to severely reduce the effectiveness of this material as a drag-reducing substance.

Numerous attempts have been made to overcome the disadvantages inherent in cold-flowing polymers. Representative, but non-exhaustive, of such art is that described in U.S. Pat. No. 3,791,913, wherein elastomeric pellets are surface cured, i.e., vulcanized to a minor depth in order to maintain the unvulcanized interior of the polymer in a "sack" of cured material, and U.S. Pat. No. 4,147,677, describing a method of preparing a free-flowing, finely divided powder of neutralized sulfonated elastomer by admixing with fillers and oils. This reference does not teach a method for making free-flowing powders of non-elastomeric material. U.S. Pat. No. 3,736,288 teaches solutions of drag-reducing polymers in inert, normally liquid vehicles for addition to liquids flowing in conduits. A "staggered dissolution" effect is provided by varying the size of the polymer particles. Suspension or surface-active agents can also be used. While directed to ethylene oxide polymers, the method is useful for hydrocarbon-soluble polymers as well. U.S. Pat. No. 4,088,622 describes a method of making an improved, molded drag-reducing coating by incorporating antioxidants, lubricants, and plasticizers and wetting agents in the form of a coating which is bonded directly onto the surface of materials passing through a liquid medium. U.S. Pat. No. 4,340,076 teaches a process for dissolving ultra-high molecular weight hydrocarbon polymer and liquid hydrocarbons by chilling to cryogenic temperatures comminuting the polymer formed into discrete particles and contacting these materials at near cryogenic temperatures with the liquid hydrocarbons to more rapidly dissolve the polymer. U.S. Pat. No. 4,341,078 immobilizes toxic liquids within a container by injecting a slurry of cryogenically ground polymer particles while still at cryogenic temperatures into the toxic liquid. U.S. Pat. No. 4,420,440 teaches a method for collecting spilled hydrocarbons by dissolving sufficient polymer to form a nonflowing material of semi-solid consistency by contacting said hydrocarbons with a slurry of cryogenically comminuted ground polymer particles while still at cryogenic temperatures.

Some current drag-reduction systems inject a drag-reducing polymer solution containing a high percentage of dissolved, ultra-high molecular weight polymer into conduits containing the hydrocarbon. The drag-reducing polymer solution is normally extremely thick and difficult to handle at low temperatures. Depending upon the temperature of the hydrocarbon and the concentration at which the drag-reducing polymer solution is injected, significant time elapses before dissolution and resulting drag reduction. Solid polymers of these types can take days to dissolve in some cases, even though drag reduction is greatly enhanced once dissolution has finally occurred. Also, such ultra-high molecular weight polymer solutions become very viscous as polymer content increases, in some cases limiting the practical application of these solutions to those containing no more than about 15 weight percent polymer. This makes complex equipment necessary for storing, dissolving, pumping, and injecting metered quantities of drag-reducing material into flowing hydrocarbons.

Another way to introduce ultra-high molecular weight polymers into the flowing hydrocarbon stream is through a suspension. The ultra-high molecular weight polymers are suspended in a liquid that will not dissolve or will only partially dissolve the ultra-high molecular weight polymer. This suspension is then introduced into the flowing hydrocarbon stream. The tendency of the ultra-high molecular weight polymers to reagglomerate makes manufacture of these suspensions difficult. A way of controlling the tendency of the ultra-high weight polymers to reagglomerate is to partially surround the polymer particles with a partitioning agent, occasionally termed a coating material, to reduce the ability of these polymers to reagglomerate. U.S. Pat. No. 4,584,244, which is hereby incorporated by reference, describes a process whereby the polymer is ground and then coated with alumina to form a free-flowing powder. Some processes using a partitioning agent require that the partitioning agent completely surround the polymer core, which requires that at least 20% and often as much as 50% of the weight of the final composition be the coating agent. Other examples of partitioning agents used in the art include talc, tri-calcium phosphate, magnesium stearate, silica, polyanhydride polymers, sterically hindered alkyl phenol antioxidants, and graphite. Partitioning agents, however, add weight to the drag-reducing agent material, resulting in higher transport costs and additional handling equipment, without any drag-reducing benefit. Further, some partitioning agents are incompatible with the hydrocarbon fluid or may be an unwanted contaminant of the hydrocarbon fluid.

SUMMARY OF THE INVENTION

Accordingly, a drag-reducing suspension and a method of producing a drag-reducing suspension are disclosed herein. One embodiment of the present invention is drawn to a method for the preparation of a drag-reducing polymer suspension wherein an ultra-high molecular weight polymer is mixed with a grinding aid to form a polymer/grinding aid mixture. This mixture is then ground at a temperature below the glass transition temperature of the ultra-high molecular weight polymer to form ground polymer/grinding aid particles. The ground polymer/grinding aid particles are then mixed with a suspending liquid to form the drag-reducing polymer suspension. In another embodiment of the present invention, drag-reducing polymer suspension is prepared by cooling an ultra-high molecular weight polymer with nitrogen, helium, argon, or dry ice. The ultra-high molecular weight polymer is a linear poly($\alpha$-olefin) comprised of monomers with carbon chain lengths of between 4 and 20 carbons. The ultra-high molecular weight polymer is mixed with a grinding aid to form a polymer/grinding aid mixture. This mixture is then ground at a temperature below the glass transition temperature of the ultra-high molecular weight polymer. The mixture is then mixed with a suspending fluid. At least one of the following components is then added to the suspending fluid: wetting agent, antifoaming agent, and thickening agent.

One advantage of the present invention is that the drag-reducing polymer suspension is easily transportable and does not require pressurized or special equipment for storage, transport, or injection. Another advantage is that the drag-reducing polymer is quickly dissolved in the flowing hydrocarbon stream. Yet another advantage of the present invention is that the extra bulk and cost associated with the inert coating agent may be eliminated, allowing easier transport. Still another advantage of the present invention is that reagglomeration of the drag-reducing polymers is greatly reduced, allowing for easier handling during manufacture. Another advantage of the present invention is that the drag-reducing polymer suspension is stable, allowing a longer shelf life and balancing of customer demand with manufacturing time. A further advantage of the present invention is that the amount of inert ingredients in the final product is reduced. In addition, manufacturing throughput is increased by the use of the grinding aid.

DETAILED DESCRIPTION OF THE INVENTION

Figure 1:
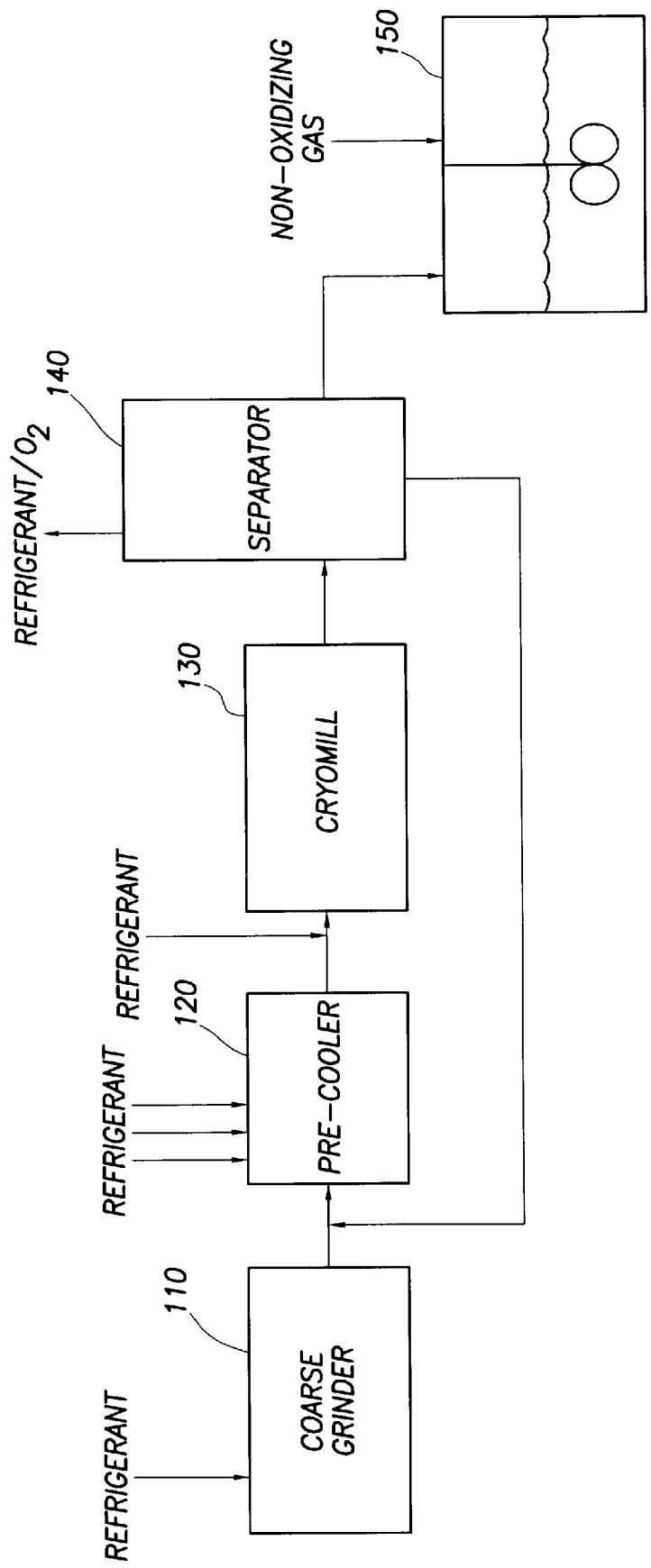
FIG. 1 is a schematic of the apparatus for manufacturing the drag-reducing polymer suspension.

In the present invention, ultra-high molecular weight polymers are ground at temperatures below the glass transition temperature of the polymer or polymer blends, and then mixed in a suspending fluid. These polymers are generally not highly crystalline. An ultra-high molecular weight polymer typically has a molecular weight of greater than 1 million, preferably more than 5 million. Glass transition temperatures vary with the type of polymer, and typically range between −10° C. and −100° C. (14° F. and −148° F.). This temperature can vary depending upon the glass transition point of the particular polymer or polymer blend, but normally such grinding temperatures must be below the lowest glass transition point of any polymer that comprises a polymer blend.

A preferred ultra-high molecular weight polymer is typically a linear poly($\alpha$-olefin) composed of monomers with a carbon chain length of between four and twenty carbons or mixtures of two or more such linear poly($\alpha$-olefins). Typical examples of these linear poly($\alpha$-olefins) include, but are not limited to, poly(1-octene), poly(1-nonene) and poly(1-decene). The ultra-high molecular weight polymer may also be a copolymer, i.e., a polymer composed of two or more different types of monomers, as long as all monomers used have a carbon chain length of between four and twenty carbons. Other polymers of a generally similar nature that are soluble in the liquid hydrocarbon will also function in the invention.

As shown in FIG. 1, the ultra-high molecular weight polymer is conveyed to coarse chopper 110. Coarse chopper 110 chops large chunks of polymer into small polymer pieces, typically between 1 to ½ centimeters (⅜ inch to ⅝ inch) in diameter. While coarse chopper 110 may be operated at ambient temperatures, it is preferable to cool the polymer in coarse chopper 110 to between 5° C. to 15° C. (41° F. to 59° F.). The polymer in coarse chopper 110 maybe cooled either internally or externally or both, with a liquid gaseous or solid refrigerant or a combination thereof, but most commonly by spraying a liquid refrigerant into coarse-chopper 110, such as liquid nitrogen, liquid helium, liquid argon, or mixtures of two or more such refrigerants, or by mixing the ultra-high molecular weight polymer with a solid such as dry ice (frozen carbon dioxide), ice (frozen water), or other solids which are miscible in the suspending fluid described below or soluble under the conditions of making a drag-reducing polymer suspension of this invention. If a solid refrigerant is used, such as dry ice (frozen carbon dioxide), or ice (frozen water) is used, the amount of solid refrigerant added is typically between 5 and 30% of the amount of ultra-high molecular weight polymer, by weight. A small amount, typically less than 5% and preferably less than 4% by weight of the total mixture of a partitioning agent, may be used in coarse chopper 110 in order to prevent agglomeration of the small polymer pieces. Partitioning agent amounts used in coarse chopper 110 should be minimized so that the amount of inert material in the final suspension that does not perform as a drag reducer is reduced.

The small pieces of polymer formed in coarse chopper 110 are then transported to pre-cooler 120. This transport may be accomplished by any number of typical solids handling methods, but is most often accomplished through the use of an auger or a pneumatic transport system. Pre-cooler 120 may be an enclosed screw conveyor with nozzles for spraying a liquid refrigerant, such as liquid nitrogen, helium, argon, or mixtures thereof, onto the small polymer pieces. While a gaseous refrigerant may also be used alone, the cooling efficiency is often too low. A grinding aid is added to the ultra-high molecular weight polymer prior to cooling in pre-cooler 120. A preferred grinding aid is a material with a melting point of between −100° C. to 25° C. (−148° F. to 77° F.), or a material that is totally soluble in the suspending fluid under the conditions disclosed herein when the suspension is produced in mixing tank 150. Examples of grinding aids include ice (frozen water), sucrose, glucose, lactose, fructose, dextrose, sodium saccharin, aspartame, starches, solid propylene carbonate, solid ethylene carbonate, solid t-butyl alcohol, solid t-amyl alcohol, phenol, and mixtures thereof. If such solids are in liquid form at ambient temperatures, they must not be a solvent for the ultra-high molecular weight polymer and should not be a contaminant or be incompatible with the hydrocarbon liquid or mixture for which drag reduction is desired. The grinding aid particles may be of any shape, but are typically crushed, or in the form of pellets or cubes. The grinding aid particles are preferably of equal size or smaller than the small polymer pieces and are more preferably between 1 mm and 65 mm (1/32 inch to 1/4 inch) in diameter. While the amount of grinding aid added is not critical, it is typically added so that the polymer/grinding aid mixture is between 5% and 40% by weight of the grinding aid by weight of the total mixture, with the balance being high molecular weight polymer.

Pre-cooler 120 reduces the temperature of the small polymer pieces and grinding aid to a temperature below the glass transition temperature of the polymer. This temperature is preferably below –130° C. (–202° F.), and most preferably below –150° C. (–238° F.). These temperatures may be produced by any known methods, but use of a liquid refrigerant such as that consisting essentially of liquid nitrogen, liquid helium, liquid argon, or a mixture of two or more such refrigerants sprayed directly onto the polymer is preferred, as the resulting atmosphere reduces or eliminates hazards that exist when polymer particles are mixed with an oxygen-containing atmosphere. The rate of addition of the liquid refrigerant may be adjusted to maintain the polymer within the preferred temperature range.

After the small polymer pieces/grinding aid mixture is cooled in pre-cooler 120, it is transported to cryomill 130. Again, this transport maybe accomplished by any typical solids handling method, but often by an auger or a pneumatic transport system. A liquid refrigerant may be added to cryomill 130 in order to maintain the temperature of the ultra-high molecular weight polymer in cryomill 130 below the glass transition temperature of the ultra-high molecular weight polymer. In one embodiment of the invention, this liquid refrigerant is added to the small polymer pieces/grinding aid mixture at the entrance to cryomill 130. The temperature of the cryomill must be kept at a temperature below the glass transition temperature. It is preferable to maintain the temperature of the cryomill between –130° C. to –155° C. (–202° F. to –247° F.). Cryomill 130 may be any of the types of cryomills known in the art, such as a hammermill or an attrition cryomill. In an attrition cryomill, the small polymer pieces/grinding aid mixture is ground between a rapidly rotating disk and a stationary disk to form small particles between 10 and 800 microns in diameter. No additional partitioning agent is added in cryomill 130.

The small particles formed in cryomill 130 are then transferred to separator 140. Most of the liquid refrigerant vaporizes in separator 140. Separator 140 acts to separate the primarily vaporized refrigerant atmosphere from the solid particles, and the larger particles from the smaller particles. Separator 140 may be any known type of separator suitable for separating particles of this size, including a rotating sieve, vibrating sieve, centrifugal sifter and cyclone separator. Separator 140 vents a portion of the primarily vaporized refrigerant atmosphere from cryomill 130 and separates particles into a first fraction with less than about 400 microns in diameter from a second fraction of those with diameters of about 400 microns and above. The second fraction of those particles of about 400 microns and greater is discarded or preferably returned for recycle purposes to the pre-cooler for re-grinding. The first fraction of those particles of less than about 400 microns is then transported to mix tank 150. The 400 micron size for the particles is nominal and may vary or have a distribution anywhere from about 300 to about 500 microns, depending on the separator, operating conditions, and desired end use.

The small polymer particles (the first fraction) are mixed with a suspending fluid in mix tank 150 to form a suspending fluid/polymer particles/grinding aid mixture. For many other mixtures, lower carbon alcohols such as methanol, ethanol, or their mixtures, with or without water, may also be used as the suspending fluid. The suspending fluid is any liquid that is a non-solvent for the ultra-high molecular weight polymer. Water is most commonly used. Mix tank 150 may be any type of vessel designed to agitate the mixture to achieve uniform composition of the suspending fluid polymer particles mixture, typically a stirred tank reactor. Mix tank 150 acts to form a suspension of the polymer particles in the suspending fluid. The grinding aid particles melt in the mix tank to mix with the carrier fluid. Other components may be added to the mix tank before, during, or after mixing the ground polymer particles with the suspending fluid in order to aid the formation of the suspension, and/or to maintain the suspension. For instance, glycols, such as ethylene glycol or propylene glycol, may be added for freeze protection or as a density balancing agent. The amount of glycol added may range from 10% to 60% of the suspending fluid, as needed. A suspension stabilizer may be used to aid in maintaining the suspension of the ultra-high molecular weight particles. Typical suspension stabilizers include talc, tri-calcium phosphate, magnesium stearate, silica, polyanhydride polymers, sterically hindered alkyl phenol antioxidants, and graphite. Partitioning agent added in coarse chopper 110 will often function as a suspension stabilizer as well. The total amount of partitioning agent/suspension stabilizer added may range from 0% to 40% of the suspending fluid, by weight, but is preferably between 5% and 25%, most preferably between 8% and 12%. A wetting agent, such as a surfactant may be added to aid in the dispersal of the polymer particles to form a uniform mixture. Non-ionic surfactants, such as linear secondary alcohol ethoxylates, linear alcohol ethoxylates, alkylphenol exthoxylates, and anionic surfactants, such as alkyl benzene sulfonates and alcohol ethoxylate sulfates, e.g., sodium lauryl sulfate, are preferred. The amount of wetting agent added may range from 0.01% to 1% by weight of the suspending fluid, but is preferably between 0.01% and 0.1%. In order to prevent foaming of the suspending fluid/polymer particle grinding aid mixture during agitation, a suitable antifoaming agent may be used, typically a silicon or oil based commercially available antifoam. Generally, no more than 1% of the suspending fluid by weight of the active antifoaming agent is used. Representative but non-exhaustive examples of antifoaming agents are the trademark of, and sold by, Dow Corning, Midland, Mich.; and Bubble Breaker products, trademark of, and sold by, Witco Chemical Company, Organics Division. Mix tank 150 may be blanketed with a non-oxidizing gas such as nitrogen, argon, neon, carbon dioxide, carbon monoxide, gaseous fluorine, or chlorine, or hydrocarbons such as propane or methane, or other similar gases, or the non-oxidizing gas may be sparged into mix tank 150 during polymer particle addition to reduce the hazard of fire or explosion resulting from the interaction between the small polymer particles.

After the suspending fluid/polymer/particle mixture grinding aid is agitated to form a uniform mixture, a thickening agent may be added to increase the viscosity of the mixture. The increase in viscosity retards separation of the suspension. Typical thickening agents are high molecular weight, water-soluble polymers, including polysaccharides, xanthum gum, carboxymethyl cellulose, hydroxypropul guar, and hydroxyethyl cellulose. Where water is the suspending fluid, the pH of the suspending fluid should be basic, preferably above 9 to inhibit the growth of microorganisms.

The product resulting from the agitation in the mix tank is a stable suspension of a drag-reducing polymer in a suspending fluid suitable for use as a drag-reducing agent. This suspension may then be pumped or otherwise transported to storage for later use, or used immediately.

The liquid refrigerant, as well as the suspending fluid, grinding aid, partitioning agent, detergent, antifoaming agent, and thickener, should be combined in effective amounts to accomplish the results desired and to avoid hazardous operating conditions. These amounts will vary depending on individual process conditions and can be determined by one of ordinary skill in the art. Also, where temperatures and pressures are indicated, those given are a guide to the most reasonable and best conditions presently known for those processes, but temperatures and pressures outside of those ranges can be used within the scope of this invention. The range of values expressed as between two values is intended to include the value stated in the range.

What is claimed is:

1. A method for the preparation of a drag-reducing polymer suspension comprising:
   (a) mixing an ultra-high molecular weight polymer with a grinding aid to form a polymer/grinding aid mixture;
   (b) grinding the polymer/grinding aid mixture at a temperature below the glass-transition temperature of the ultra-high molecular weight polymer to form ground polymer/grinding aid particles; and
   (c) mixing the ground polymer/grinding aid particles with a suspending fluid to form the drag-reducing polymer suspension.

2. The method as described in claim 1, wherein the ultra-high molecular weight polymer comprises a linear poly($\alpha$-olefin) produced from one or more $\alpha$-olefin monomers with carbon chain lengths of between 4 and 20 carbons, or mixtures of two or more such linear poly($\alpha$-olefins).

3. The method as described in claim 1, further comprising prior to step (a): cooling the ultra-high molecular weight polymer with one or more refrigerants selected from the group consisting of liquid nitrogen, liquid helium, liquid argon, and dry ice.

4. The method as described in claim 3, further comprising prior to or simultaneously with step a):
   cooling the ultra-high molecular weight polymer to a temperature below −130° C.

5. The method as described in claim 1, wherein the grinding aid has a melting point of between −100° C. to 25° C.

6. The method as described in claim 5, wherein the grinding aid is miscible or soluble in the suspending fluid, and is selected from the group consisting of ice, sucrose, glucose, lactose, fructose, dextrose, sodium saccharin, aspartame, starches, solid propylene carbonate, solid ethylene carbonate, solid t-butyl alcohol, solid t-amyl alcohol, phenol, and mixtures thereof.

7. The method as described in claim 6, wherein the polymer/grinding aid mixture comprises between 5% and 40% grinding aid by weight of the polymer/grinding aid mixture.

8. The method of claim 1 further comprising after step a) and before step b):
   separating the ground polymer/grinding aid particles into a first fraction with a diameter of less than 400 microns from a second fraction of the ground polymer/grinding aid particles with a diameter of 400 microns or greater; and
   regrinding the second fraction of the ground polymer/grinding aid particles with a diameter of 400 microns or greater.

9. The method of claim 8, wherein the suspending fluid comprises water.

10. The method of claim 9, wherein the suspending fluid further comprises a suspension stabilizer.

11. The method of claim 9, wherein the suspending fluid further comprises one or more components selected from the group consisting of a detergent, an antifoaming agent, and a thickening agent.

12. A method for the preparation of a drag-reducing polymer suspension comprising:
   a) cooling an ultra-high molecular weight polymer with one or more refrigerants selected from the group consisting of liquid nitrogen, liquid helium, liquid argon and dry ice, wherein the ultra-high molecular weight polymer produced from linear poly($\alpha$-olefin) comprised of $\alpha$-olefin monomers with carbon chain lengths of between 4 and 20 carbons, or mixtures of two or more such linear poly($\alpha$-olefins);
   b) mixing the ultra-high molecular weight polymer with a grinding aid to form a polymer/grinding aid mixture;
   c) grinding the polymer/grinding aid mixture at a temperature below the glass transition temperature of the polymer;
   d) separating the ground polymer/grinding aid particles into a first fraction with a diameter of less than 400 microns from a second fraction of the ground polymer/grinding aid particles with a diameter of 400 microns or greater;
   e) regrinding the second fraction of the ground polymer/grinding aid particles with a diameter of 400 microns or greater; and
   d) mixing the ground polymer/grinding aid mixture particles with a suspending fluid, the suspending fluid further comprising one or more components selected from the group consisting of adding a wetting agent, an antifoaming agent, and a thickening agent.

13. The method as described in claim 12, wherein the grinding aid has a melting point of between −100° C. to 25° C.

14. The method of claim 12, wherein the grinding aid is miscible or soluble in the suspending fluid, and is selected from the group consisting of ice, sucrose, glucose, lactose, fructose, dextrose, sodium saccharin, aspartame, starches, solid propylene carbonate, solid ethylene carbonate, solid t-butyl alcohol, solid t-amyl alcohol, phenol, and mixtures thereof.

15. The method as described in claim 12, wherein the polymer/grinding aid mixture comprises between 5% and 40% grinding aid by weight of the polymer/grinding aid mixture.

16. The method of claim 13, wherein the suspending fluid comprises water.

17. The method of claim 14, wherein the suspending fluid further comprises a suspension stabilizer.

* * * * *